United States Patent [19]

Nothofer

[11] Patent Number: 4,739,435
[45] Date of Patent: Apr. 19, 1988

[54] SAFETY DEVICE FOR AN ELECTRIC POWER TOOL

[75] Inventor: Michael Nothofer, Stuttgart, Fed. Rep. of Germany

[73] Assignee: C. & E. Fein GmbH & Co., Stuttgart, Fed. Rep. of Germany

[21] Appl. No.: 822,059

[22] Filed: Jan. 24, 1986

[30] Foreign Application Priority Data

Jun. 5, 1985 [DE] Fed. Rep. of Germany ....... 3520099

[51] Int. Cl.⁴ .............................................. H02H 7/08
[52] U.S. Cl. ........................................ 361/23; 361/86; 318/463
[58] Field of Search .................... 361/23, 24, 31, 87, 361/33, 86, 194, 195; 318/434, 450, 461, 463

[56] References Cited

U.S. PATENT DOCUMENTS

| | | | |
|---|---|---|---|
| 3,284,668 | 11/1966 | Heaslip | 361/239 |
| 3,558,978 | 1/1971 | Nye, Jr. | 361/31 X |
| 3,575,636 | 4/1971 | Nantes | 361/23 |
| 4,196,462 | 4/1980 | Pohl | 361/33 |
| 4,314,186 | 2/1982 | Gille et al. | 361/23 X |
| 4,384,312 | 5/1983 | Fry | 361/27 X |
| 4,389,692 | 6/1983 | Sanders et al. | 361/24 X |
| 4,412,158 | 10/1983 | Jefferson et al. | 318/257 |
| 4,473,856 | 9/1984 | Takahashi et al. | 361/31 |

*Primary Examiner*—A. D. Pellinen
*Assistant Examiner*—Jeffrey A. Gaffin
*Attorney, Agent, or Firm*—Max Fogiel

[57] ABSTRACT

A safety device for an electric power tool, especially a portable tool. It has a main switch, electronic controls, a tachometer-generator, and a relay. The relay electrically parallels the motor, acts on the supply of current to the motor through a relay contact, and is activated through the tachometer-generator and through a subsequent safety circuit. To provide a means of switching off the motor at excessively high speeds that will be inexpensive to manufacture and that will maintain a constant switch-off reference speed throughout its life, the safety circuit consists of a synchronization stage, an adjustable timer stage, a processing stage, an ignition amplifier, and an output section.

2 Claims, 4 Drawing Sheets

SAFETY DEVICE FOR AN ELECTRIC POWER TOOL

BACKGROUND OF THE INVENTION

The present invention relates to a safety device for an electric power tool, especially a portable tool, with a main switch, electronic controls, a tachometer-generator, and a relay that electrically parallels the motor, that acts on the supply of current to the motor through a relay contact, and that is activated through the tachometer-generator and through a subsequent safety circuit.

Known electric power tools are turned on and off through a main switch. The motor is governed by electronic controls that obtain an actual value from a tachometer-generator. When the controls break down, the motor can run too fast. The speed can increase to the extent that, for example, the grinding disk on an angled grinder can burst. It is accordingly desirable for the motor to switch off when the controls break down.

One means of ensuring that they will do so is a centrifugal-force switch of the type described in German Pat. No. 638 928. The mechanical components involved in this mode of ensuring that the motor will switch off at excessively high speeds make it very expensive, however. The device is also very sensitive to contamination, from the aspect of accuracy of function for example.

SUMMARY OF THE INVENTION

The object of the present invention is accordingly to provide a means of switching off a motor at excessively high speeds that will be inexpensive to manufacture and that will maintain a constant switch-off reference speed throughout its life.

This object is attained in accordance with the invention in an electric power tool of the aforesaid type wherein the safety circuit consists of a synchronization stage, an adjustable timer stage, a processing stage, an ignition amplifier, and an output section.

A pulse arriving from the output section activates the relay, which then maintains itself in the active state and interrupts the supply of current to the motor. The relay maintains itself in the active state until the main switch switches off.

In one practical embodiment of the invention the safety circuit is in electrical series with the relay. The relay is activated through the main switch, allowing current to be supplied to the motor. Once a prescribed maximum speed is attained, a thyristor that electrically parallels the relay diverts the current around the relay, which goes out of action and interrupts the supply of current to the motor even though the main switch is on.

Preferred embodiments of the invention will hereinafter be described with reference to the appended drawings. It is to be understood, however, that these are merely by way of example and that the scope of the protection sought for the invention is defined exclusively in the claims.

DETAILED DESCRIPTION OF THE PREFERRED EMBODIMENTS

Figure 1:
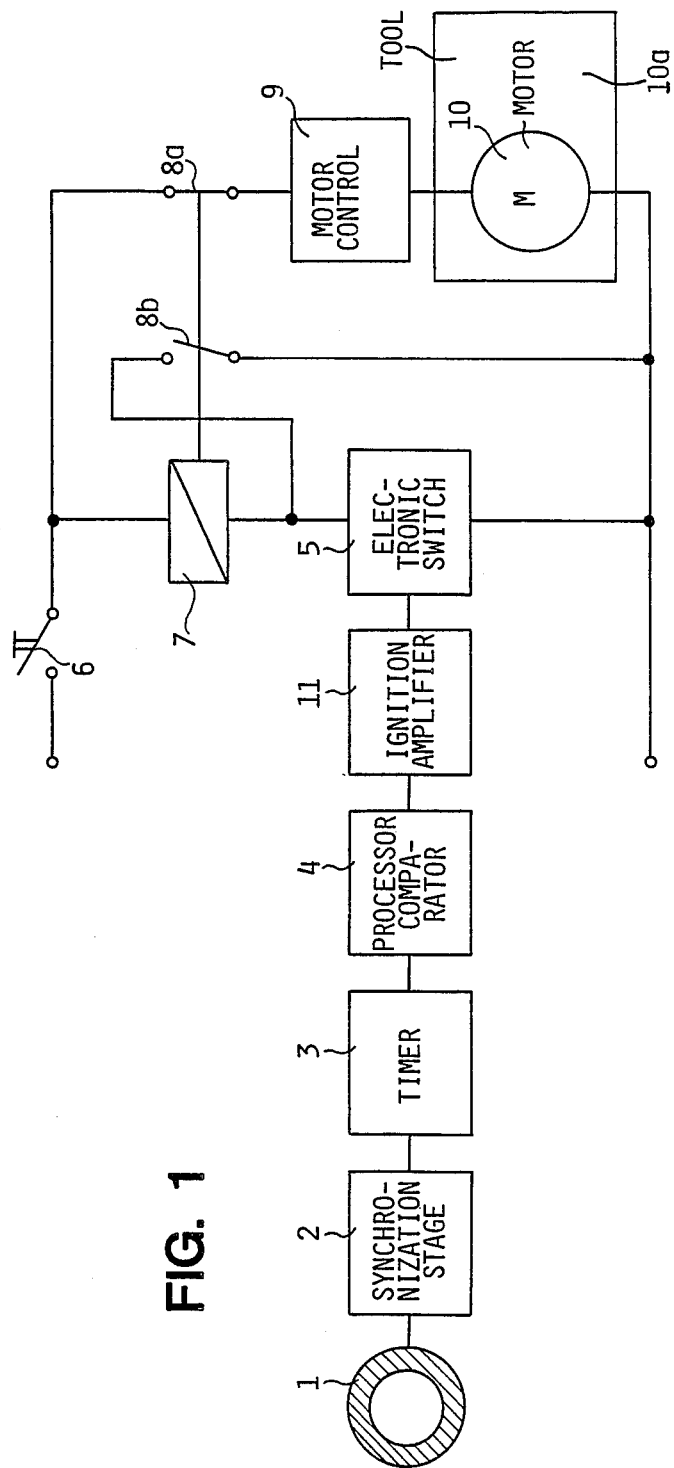
FIG. 1 is a block diagram of the safety device in accordance with the invention, FIG. 2 the circuitry involved in the system illustrated in FIG. 1.

The tachometer-generator 1 in the safety device illustrated in FIG. 1 emits a signal with a frequency that is proportional to the speed of revolution of a motor 10. This signal, the actual value, is supplied to a synchronization stage 2 that triggers a downstream timer stage 3. Timer stage 3 generates a pulse signal, the reference value, with a length that corresponds to the maximal period (maximal speed). The pulse signal is compared to a tachometer signal in the subsequent processing stage 4, which generates a signal when the actual value is lower than the reference value. This signal arrives at an output section 5 or electronic switch through an ignition amplifier 11. Output section 5, which is in this case a triac for example, ceases to block access to the series-wired relay 7, which can accordingly turn on and interrupt the supply of current to motor 10 through relay contact 8a. To prevent the motor from turning on again when the speed drops below the prescribed level, relay 7 will as it turns on activate not only relay contact 8a but also another relay contact 8b. Since relay contact 8b bridges over output section 5, relay 7 will maintain itself in the active state until main switch 6 is opened.

Figure 2:
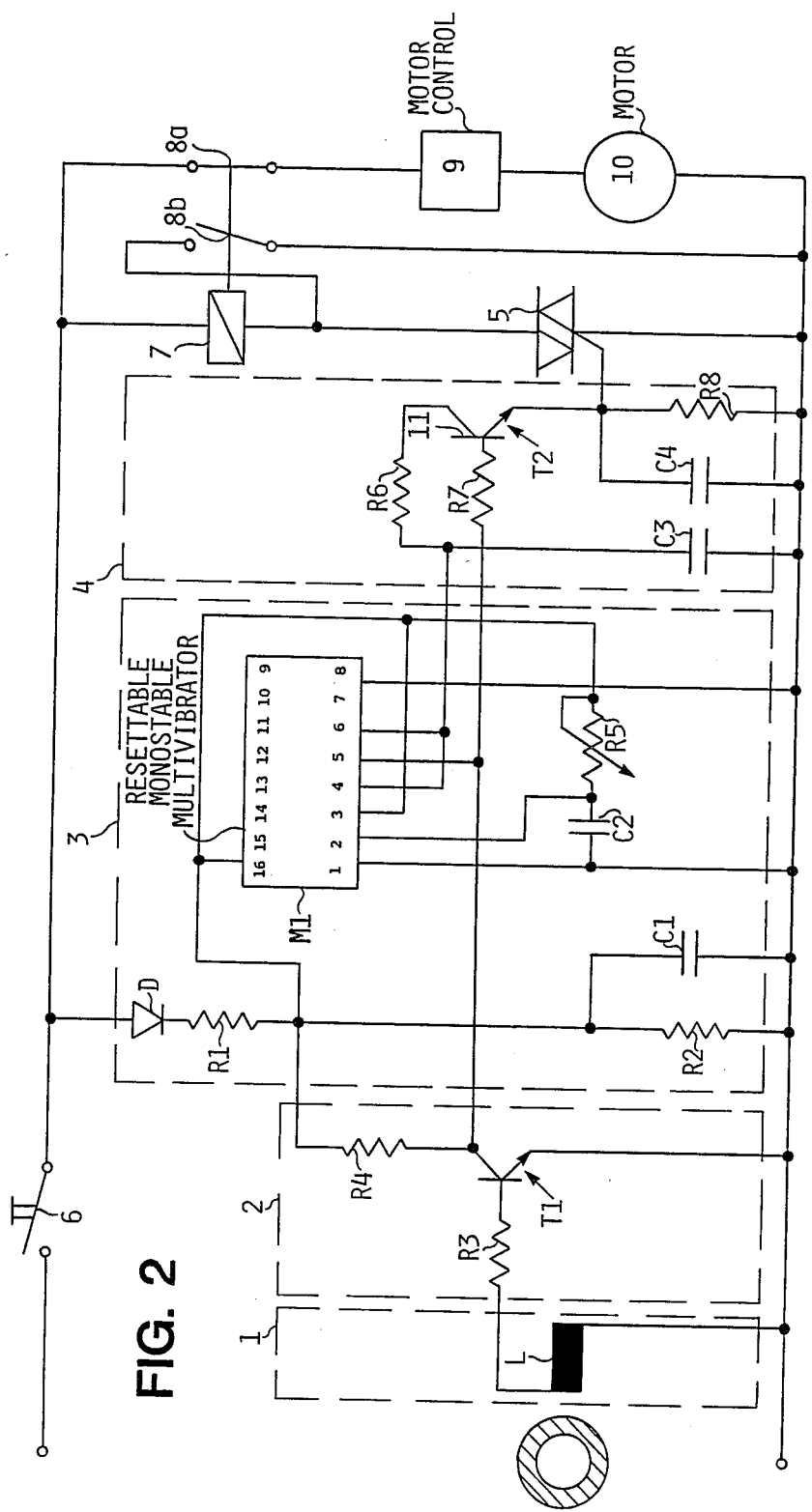

FIG. 2 illustrates the circuitry in greater detail. Synchronization stage 2, which consists of resistors R3 and R4 and of a transistor T1, derives a synchronous square signal from the alternating voltage induced in the coil L of tachometer-generator 1. The square signal triggers adjustable timer stage 3, which generates a time-constant rectangular signal at its output. The two values are compared in the subsequent processing stage 4, which consists of resistances R6 and R7 and of a transistor T2, and another signal is generated when the prescribed time is longer than the period of the synchronous rectangular signal. Transistor T2 also directly functions as an ignition amplifier 11, igniting output section 5, which is a triac in the present case. Circuit M1 in FIGS. 2 and 4 is a resettable monostable multivibrator.

Figure 3:
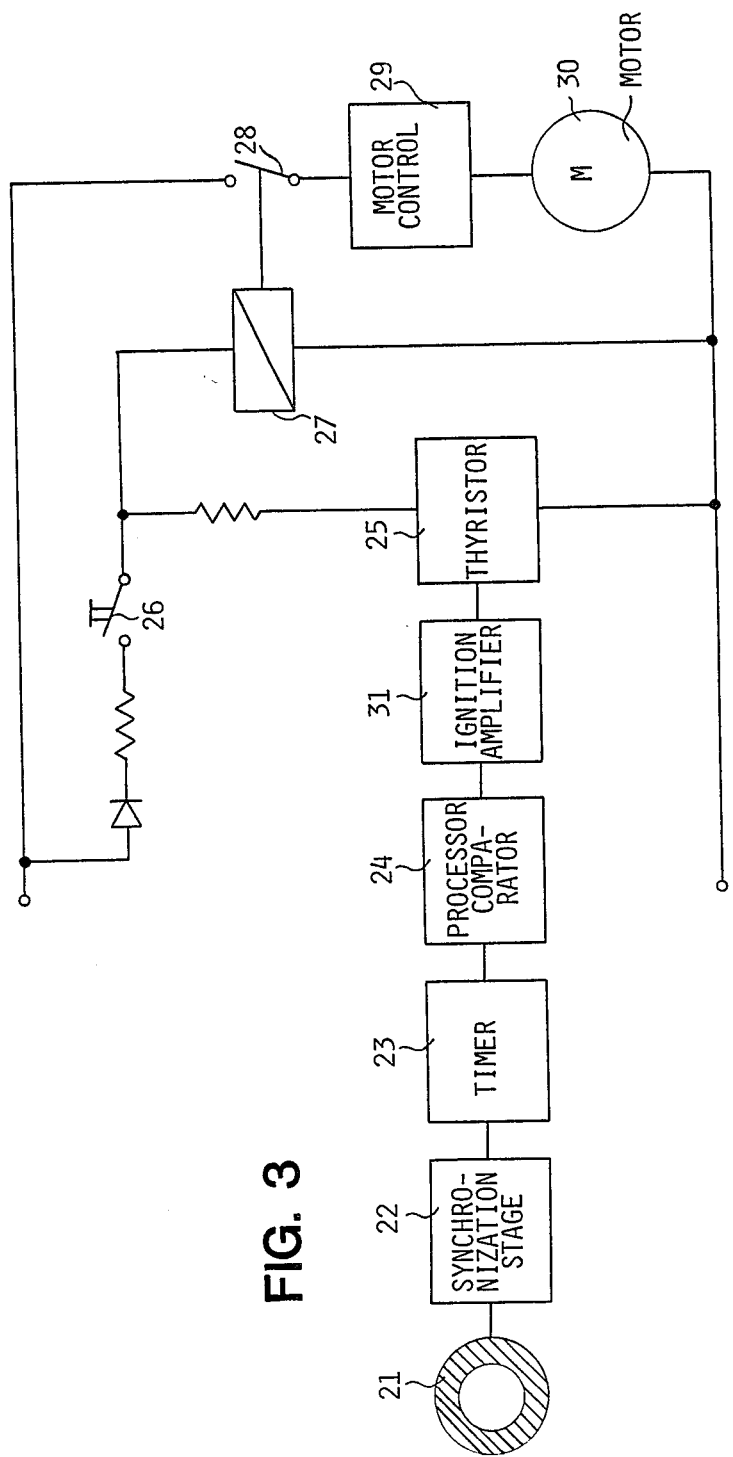
FIG. 3 is a block diagram of another embodiment of the safety device in accordance with the invention and, FIG. 4 illustrates the circuitry involved in the system illustrated in FIG. 2.

FIG. 3 illustrates another embodiment. The safety device consists in principle of the same elements as in the previous example. The switch-off signal arrives at an ignition amplifier 31 through a tachometer-generator 21, a synchronization stage 22, an adjustable timer stage 23, and a processing stage 24. In this case, however, spark amplifier 31 releases a signal to a thyristor 25 when the permissible speed is exceeded. Thyristor 25 becomes conductive, the potential at the electrically parallel relay 27 drops, and relay contact 28 opens, interrupting the supply of current to motor 30. The current traveling through main switch 26 now flows through thyristor 25. The load circuit remains interrupted until main switch 26 is turned on again.

Figure 4:
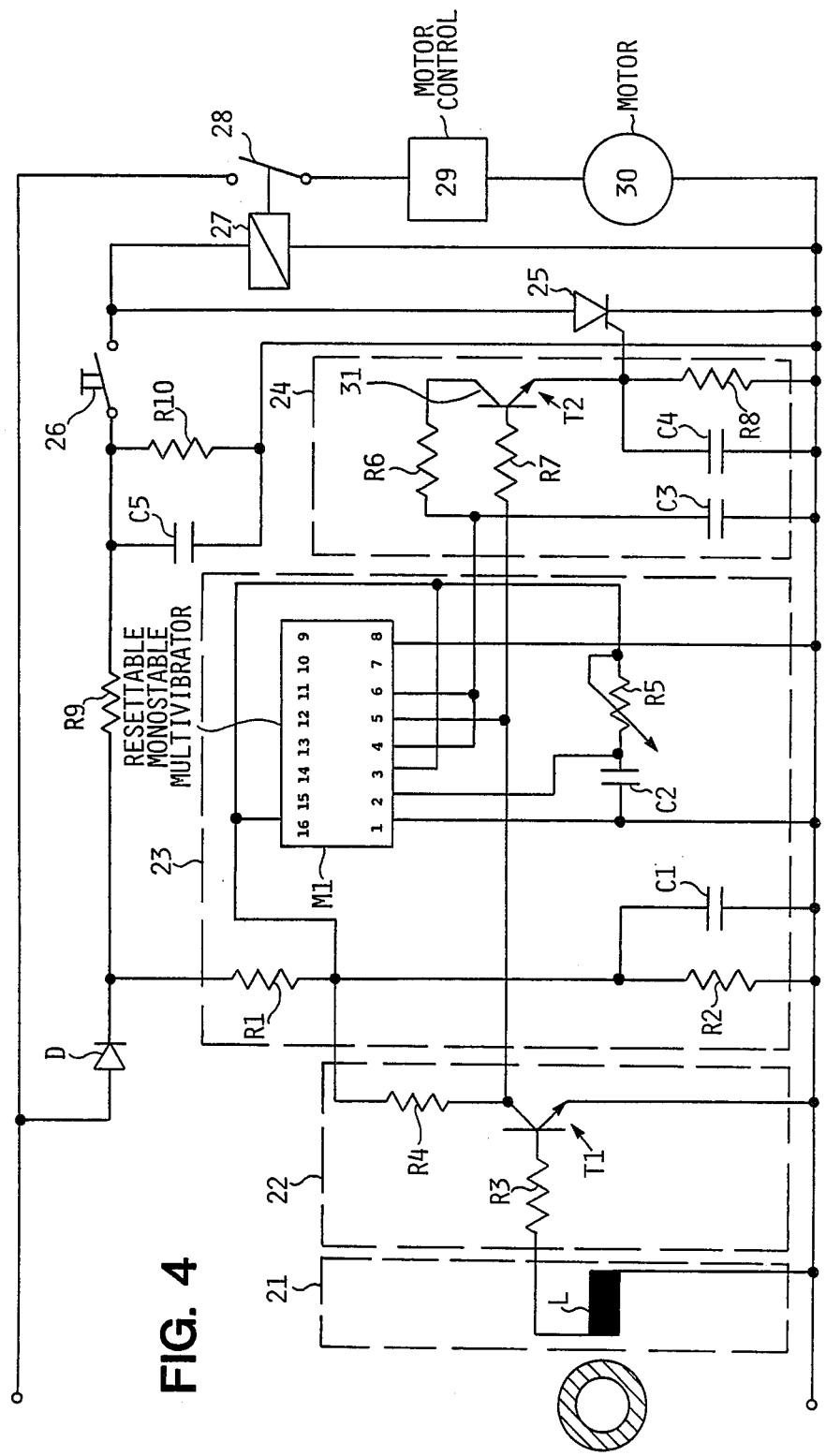

FIG. 4 illustrates the circuitry in greater detail and differs from FIG. 2 by the addition of voltage to relay 27, which is now directly in the path of the voltage once main switch 26 has been activated.

As will be obvious to one skilled in the art, the thyristor 25 in this embodiment can be replaced with a transistor circuit that can short-circuit the supply of voltage to relay 27.

The circuitry described herein with respect to both embodiments of the safety device in accordance with the invention is an inexpensive, reliable, and easy to manufacture expansion of the type of electronic controls 9 or 29 now employed in electric power tools. They will protect the operator from the risk of a tool rotating out of control.

The invention has been described herein with reference to exemplary embodiments. It will be understood, however, that it is receptable of various modifications, which will offer themselves to those skilled in the art and which are intended to be encompassed within the protection sought for the invention as set forth in the appended claims.

I claim:

1. A safety device for an electric power tool, comprising: an electric power tool; an on-off switch in a power circuit line connected to said tool for switching power to said tool on and off; a motor means for driving a tool; electronic control means connected to said motor means for controlling operation of said motor means; a tachometer-generator means for controlling speed of said motor means, said tachometer-generator means emitting a signal with frequency proportional to angular speed of said motor means; an adjustable timer means; a synchronizing stage connected to said adjustable timer means and having an input connected to said tachometer-generator means, said signal from said tachometer-generator means being applied to said synchronizing stage, said synchronizing stage triggering said adjustable timer means, said timer means generating a pulse signal corresponding to a reference value and having a length corresponding to maximum speed; a comparator means connected to said timer means for comparing said pulse signal with said signal from said tachometer-generator means, said comparator means generating a signal when actual speed is less than said reference value; an ignition amplifier connected to an electronic switching means, said signal from said comparator means being applied to said electronic switch means through said ignition amplifier; a relay means connected in parallel with said motor means, said relay means having a switching contact for switching current supplied to said motor means; an auxiliary contact on said relay means, said relay means being able to maintain itself in an actuated state through said auxiliary contact until said on-off switch in said power circuit line is switched to off position, so that said motor means is prevented from operating when the speed drops below a predetermined magnitude, said auxiliary contact bridging said electronic switch.

2. A safety device as defined in claim 1, wherein said electronic switching means comprises a thyristor.

* * * * *